United States Patent
Willis et al.

(10) Patent No.: US 10,353,696 B2
(45) Date of Patent: Jul. 16, 2019

(54) PROGRAM RELEASE PACKAGES INCLUDING PROGRAM UPDATES

(71) Applicant: BlackBerry Limited, Waterloo (CA)

(72) Inventors: Edward Snow Willis, Ottawa (CA); Christopher Scott Travers, Ottawa (CA); Yuhui Liu, Waterloo (CA); Ning Erin Ren, Kitchener (CA); Hashim Mohammad Qaderi, Kitchener (CA); Karthik Velakur Sambamoorthy, Waterloo (CA); Parvez Ahmed, Brampton (CA); Eric Yeung, Whitby (CA); Evgueni Eugene Markine, Cambridge (CA); Scott Hutchens, Ottawa (CA); Conrad Delbert Seaman, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 15/486,979

(22) Filed: Apr. 13, 2017

(65) Prior Publication Data

US 2018/0300123 A1 Oct. 18, 2018

(51) Int. Cl.
*G06F 8/658* (2018.01)
*G07C 5/00* (2006.01)
(Continued)

(52) U.S. Cl.
CPC ............ *G06F 8/658* (2018.02); *G07C 5/008* (2013.01); *H04L 67/12* (2013.01); *H04L 67/34* (2013.01); *G06F 8/61* (2013.01)

(58) Field of Classification Search
CPC ........... G06F 8/68; H04L 67/12; H04L 67/34; G07C 5/008
(Continued)

(56) References Cited

U.S. PATENT DOCUMENTS 6,986,134 B1 * 1/2006 Foster ....................... G06F 8/61
717/177
7,349,769 B2 * 3/2008 Hayashi ................. G01C 21/26
717/177
(Continued)

FOREIGN PATENT DOCUMENTS

CA 2455106 A1 7/2004
CA 2502113 A1 11/2005
(Continued)

OTHER PUBLICATIONS

Phung et al., "A Model for Safe and Secure Execution of Downloaded Vehicle Applications", May 2010, IEEE (Year: 2010).*
(Continued)

*Primary Examiner* — Wei Y Zhen
*Assistant Examiner* — Junchun Wu
(74) *Attorney, Agent, or Firm* — Trop, Pruner & Hu, P.C.

(57) ABSTRACT

In some examples, a system receives information of vehicles, the information comprising information of programs executable in the vehicles. The system selects, based on the received information of the vehicles, program updates to include in a program release package, the program updates comprising a patch to update programs in the vehicles, the selecting based on determining how many vehicles are able to apply the program updates of the program release package.

19 Claims, 4 Drawing Sheets

(51) Int. Cl.
*H04L 29/08* (2006.01)
*G06F 8/61* (2018.01)

(58) Field of Classification Search
USPC .......................................................... 717/169
See application file for complete search history.

(56) References Cited

U.S. PATENT DOCUMENTS

| | | | | |
|---|---|---|---|---|
| 7,366,589 | B2* | 4/2008 | Habermas | G06F 8/65 |
| | | | | 717/173 |
| 8,190,322 | B2* | 5/2012 | Lin | G07C 5/008 |
| | | | | 701/29.1 |
| 8,707,292 | B2* | 4/2014 | Little | G06F 8/65 |
| | | | | 717/172 |
| 9,575,743 | B1* | 2/2017 | Chun | B60L 58/12 |
| 9,841,965 | B2* | 12/2017 | Moeller | G06F 8/65 |
| 2005/0210459 | A1* | 9/2005 | Henderson | G06F 8/65 |
| | | | | 717/168 |
| 2007/0050777 | A1* | 3/2007 | Hutchinson | G06F 11/0709 |
| | | | | 718/104 |
| 2007/0236734 | A1* | 10/2007 | Okamoto | G03G 15/5004 |
| | | | | 358/1.16 |
| 2008/0005733 | A1 | 1/2008 | Ramachandran | |
| 2009/0119657 | A1 | 5/2009 | Link, II | |
| 2011/0130916 | A1* | 6/2011 | Mayer | G07C 5/008 |
| | | | | 701/31.4 |
| 2011/0197187 | A1* | 8/2011 | Roh | G06F 8/65 |
| | | | | 717/173 |
| 2011/0225259 | A1* | 9/2011 | Quinn | G06F 8/65 |
| | | | | 709/217 |
| 2011/0225575 | A1* | 9/2011 | Ningombam | G06F 8/65 |
| | | | | 717/170 |
| 2014/0237465 | A1* | 8/2014 | Lin | H04L 67/1063 |
| | | | | 717/173 |
| 2014/0282470 | A1* | 9/2014 | Buga | G06F 8/65 |
| | | | | 717/170 |
| 2014/0325500 | A1* | 10/2014 | Jang | G06F 8/65 |
| | | | | 717/173 |
| 2015/0113521 | A1 | 4/2015 | Suzuki et al. | |
| 2015/0193229 | A1* | 7/2015 | Bansod | G06F 8/71 |
| | | | | 717/122 |
| 2015/0212807 | A1* | 7/2015 | Elzein | G06F 8/65 |
| | | | | 717/173 |
| 2015/0347121 | A1* | 12/2015 | Harumoto | G01C 21/32 |
| | | | | 717/172 |
| 2016/0196131 | A1* | 7/2016 | Searle | H04L 41/082 |
| | | | | 717/173 |
| 2016/0196132 | A1* | 7/2016 | Searle | H04L 41/082 |
| | | | | 717/173 |
| 2016/0266886 | A1* | 9/2016 | Sarkar | G06F 8/65 |
| 2016/0335073 | A1 | 11/2016 | Hong | |
| 2016/0364224 | A1 | 12/2016 | Tuukkanen | |
| 2016/0364225 | A1* | 12/2016 | Moeller | G06F 8/65 |
| 2017/0060559 | A1* | 3/2017 | Ye | G06F 8/65 |
| 2017/0061708 | A1* | 3/2017 | Sol | G07C 5/008 |
| 2017/0315797 | A1* | 11/2017 | Vangelov | G06F 8/65 |
| 2018/0024826 | A1* | 1/2018 | Caushi | G06F 8/65 |
| | | | | 717/172 |
| 2018/0032324 | A1 | 2/2018 | Sarkar et al. | |
| 2018/0074811 | A1 | 3/2018 | Kiyama et al. | |
| 2018/0081670 | A1 | 3/2018 | Caushi et al. | |
| 2018/0108186 | A1 | 4/2018 | Lin et al. | |

FOREIGN PATENT DOCUMENTS

| | | |
|---|---|---|
| CA | 2548199 A1 | 11/2006 |
| CA | 2740683 A1 | 11/2011 |
| CN | 104636150 A | 5/2015 |
| CN | 107577473 A | 1/2018 |
| CN | 107656752 A | 2/2018 |
| CN | 107766066 A | 3/2018 |
| CN | 107797810 A | 3/2018 |
| CN | 107861732 A | 3/2018 |
| WO | 2018025685 A1 | 2/2018 |
| WO | 2018043107 A1 | 3/2018 |
| WO | 2018043381 A1 | 3/2018 |

OTHER PUBLICATIONS

Jian et al., "Design and Implementation of a Trusted Remote Remediation Framework for Vehicle Software", Jul. 2010, Chinese Control Conference (Year: 2010).*

Petri et al., "Evaluation of Lightweight TPMs for Automotive Software Updates over the Air", 2016, Fraunhofer (Year: 2016).*

Zhang et al., "Implementation and Research of Bootloader for Automobile ECU Remote Incremental Update", 2015, Atlantis Press (Year: 2015).*

Gabe Nelson, Over-The-Air Updates on Varied Paths—Companies scramble to satisfy customers, capture savings, Jan. 25, 2016 (10 pages).

Mark Phelan, Study: More Cars will get automatic software updates, Sep. 6, 2016 (2 pages).

Red Bend Software, Updating Car ECUs Over-The-Air (FOTA) White Paper, 2011 (14 pages).

Yoram Berholtz, Red Bend Software, Updating car software: Why delta technology is better than compression, Jan. 2017 (6 pages).

Harman, Harman Smart Delta Technology, Software Update Management and Deployment dated on or before Mar. 2017 (3 pages).

Roger Ordman, Efficient over-the-air software and firmware updates for the Internet of Things, Embedded Computing Design, Apr. 2014 (6 pages).

ISA/CA, International Search Report and Written Opinion for PCT/CA2018/050419 dated Jun. 28, 2018 (13 pages).

* cited by examiner

| PATCH PACKAGE GUI SCREEN | | | | | 400 |
|---|---|---|---|---|---|
| PROGRAM NAME | FULL UPDATED PROGRAM SIZE | MISSING SOURCE VERSION | ESTIMATED # AFFECTED VEHICLES | PATH LINK | |
| PROGRAM A | 20 MB | 12.0.5 | 100 | LINK A | ← 402 |
| PROGRAM B | 500 MB | 10.0.1 | 1 | LINK B | ← 404 |
| PROGRAM C | NO FULL VERSION | 9.1.2 | 80 | LINK C | ← 406 |
| ⋮ | | | | | |
| ↑ 408 | ↑ 410 | ↑ 412 | ↑ 414 | ↑ 416 | |

FIG. 4

| FULL PACKAGE GUI SCREEN | | | | 500 |
|---|---|---|---|---|
| PROGRAM NAME | VERSION IN RELEASE | ESTIMATED # AFFECTED VEHICLES | FULL UPDATED PROGRAM LINK | |
| PROGRAM A | 12.0.8 | 40 | FULL LINK A | ← 502 |
| PROGRAM B | 10.0.5 | 20 | FULL LINK B | ← 504 |
| ⋮ | | | | |
| ↑ 506 | ↑ 508 | ↑ 510 | ↑ 512 | |

FIG. 5

PROGRAM RELEASE PACKAGES INCLUDING PROGRAM UPDATES

BACKGROUND

A vehicle such as a car or other type of vehicle can be used to carry people or goods from one location to another location. A vehicle can include a large number of separate parts, including mechanical parts, electronic control units (ECUs), and other components. The ECUs are used to control various different functions of a vehicle. The ECUs and certain other electronic components can execute program code, which sometimes may have to be updated. Similarly, other types of electronic devices, such as Internet of Things (IoT) devices, can also execute program code.

BRIEF DESCRIPTION OF THE DRAWINGS

Some implementations of the present disclosure are described with respect to the following figures.

FIGS. 4 and 5 are graphical views of graphical user interface (GUI) screens according to some examples.

Figure 1:
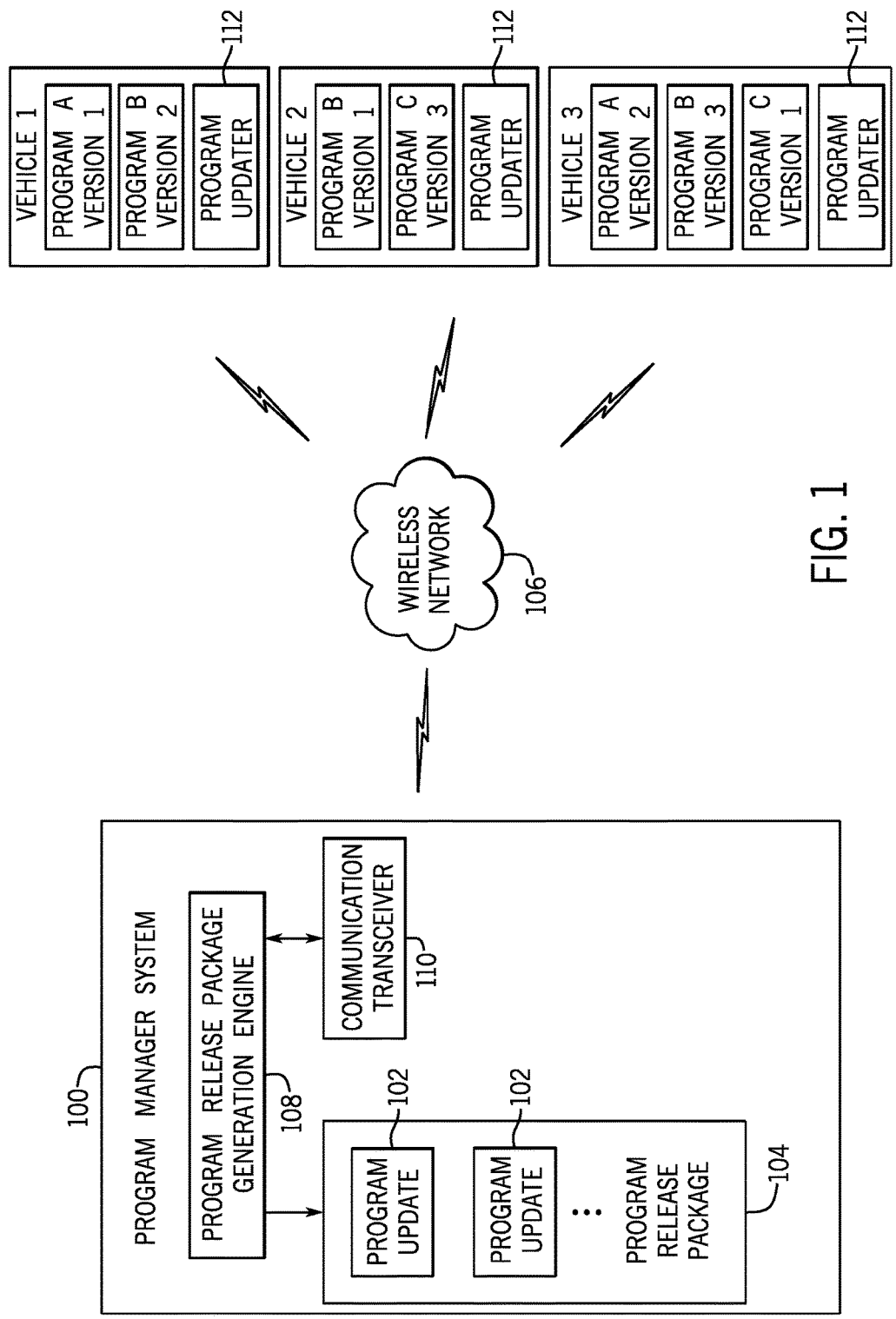
FIG. 1 is a block diagram of an example arrangement to provide a program release package to vehicles according to some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A vehicle can refer generally to any machine that is used to carry people, goods, and/or other payload from one physical location to another physical location. Examples of vehicles include any or some combination of the following: a truck, a trailer, a tractor, a car, a railed vehicle (e.g., a train), a watercraft (e.g., a ship, a submarine), an aircraft, a spacecraft, and so forth. A vehicle can also refer to a drone, which is an un-manned vehicle that can be used to perform various different actions. A vehicle can include wheels to move between different physical locations over land. Alternatively, a vehicle can include structures such as wings to allow the vehicle to fly through the air, or floatation structures to sail on or through water.

In addition to a large number of mechanical parts, a vehicle can also include electronic control units (ECUs) or other electronic components. In the present disclosure, ECUs can also be referred to as "controller units." An ECU can refer to any embedded computing system that is part of the vehicle to control one or more subsystems in the vehicle. An ECU can be implemented with a processor, or with multiple processors. Examples of subsystems that can be controlled by ECUs include an engine of a vehicle, a brake subsystem of the vehicle, an air-conditioning subsystem of the vehicle, a navigation subsystem of the vehicle, and so forth.

An ECU can also execute software or other machine-readable instructions (generally referred to as "programs") on the processor(s) of the ECU. As the ECUs of vehicles become more sophisticated, the programs that execute in the ECUs also become more complex and sophisticated.

Although reference is made to programs of ECUs of vehicles in some examples, it is noted that vehicles can also include other electronic components that can execute programs.

In some cases, it may be desirable to update the programs that are executable in a vehicle, such as to fix a bug of the programs, to add features, to address a security concern (such as to protect against malware intrusion or other hacks), or for some other reason. This update process can be rather complicated, since each vehicle can include multiple programs, and many vehicles may execute different versions of the programs.

A manager of a fleet of vehicles (or other target group of vehicles) can thus find it challenging to efficiently provide a program release package to the fleet of vehicles that can satisfy the following goals: (1) maximize (or more generally, increase) the number of vehicles that are able to apply program updates in the program release package, and (2) minimize (or more generally, reduce) the cost associated with usage of a network (such as a wireless network) to download program updates to the vehicles in the fleet.

A program release package can include program updates. A "program update" can refer to code (and possibly related information, where the related information can include metadata, such as configuration data, and data content such map data, video content, and so forth) that is used for changing a prior version of the program to a new version of the program. The program update can include a patch, which represents the difference between a prior version of the program and the new version of the program. A patch can be applied in a vehicle to update the program from a specific prior version to the new version. A patch differs from a full program in that the patch generally does not include certain common code portions between a prior version of the program and a new version of the program.

In other examples, a program update can include a full updated program, which can replace the prior version of the program. Applying a full updated program causes the prior version of the program to be replaced with the full updated program in a vehicle.

A program release package "including" program updates can refer to the program release package actually including the code of the program updates (e.g., patches and/or full updated programs), or alternatively, can refer to the program release package including references (such as in the form of pointers, addresses, locators, etc.) to the program updates, where the references can be used to determine storage locations at which the program updates are stored. The storage locations can refer to storage locations within one storage system (e.g., a disk drive, a solid state memory, etc.), or to storage locations in multiple storage systems, which can be provided at one geographic location or at multiple disparate geographic locations. The storage location(s) are accessible by the vehicle or other system over a network, such as the Internet, a private network, a wireless network (e.g., a cellular access network or wireless local area network), and so forth.

In fact, in examples where programs can be provided by different vendors, these storage locations referred to by the program release package can be storage locations at various sites (e.g., websites, servers, etc.) of the different vendors. A vendor can refer to an enterprise that makes or sells programs that can be executed in vehicles, where the programs can be programs for ECUs or other electronic components of the vehicles. An enterprise can refer to a business concern, a government agency, an educational organization, or a human individual.

The goals of maximizing the number of vehicles that are able to apply program updates in the program release package and minimizing the cost associated with usage of a network (such as a wireless network) to download program updates to the vehicles can conflict with each other. To reduce the cost of using a wireless network to download program updates to vehicles, it is desirable to include patches, rather than full updated programs, in a program release package. A patch generally has a much smaller size than a full updated program, and thus communicating the patch over the wireless network consumes less bandwidth of the wireless network than communicating the full updated program.

A given patch upgrades a specific first version of the program to a specific second version of the program. Thus, if a vehicle does not include the first version of the program, then the vehicle would not be able to use the given patch to update to the second version of the program. For example, the vehicle may include a version of the program that is earlier or later than the first version of the program, or the vehicle may not include the program at all. Thus, given a fleet of vehicles, a manager that is responsible for managing updates of the programs in the vehicles of the fleet may assume that the program release package would update a large subset or the entirety of the fleet of vehicles, when in fact there can be a substantial number of vehicles that would not be able to use patches included in the program release package due to the vehicles not having the correct versions of programs to be updated, or the vehicles not including the programs to be updated.

As used here, a "manager" of a fleet of vehicles can refer to a human administrator (or a group of human administrators), and/or a server computer or a group of server computers, and/or an administrative program or a group of administrative programs that is (are) responsible for maintaining programs of the vehicles in the fleet, where the maintaining includes updating programs to current versions.

To ensure that more vehicles are able to use the program updates of a program release package, the manager may decide to include more full updated programs in the program release package. However, full updated programs are large, such that downloading the full updated programs over a wireless network to vehicles, especially a large number of vehicles of a fleet, can consume a substantial bandwidth of the wireless network.

As noted above, a wireless network can include a cellular access network or a wireless local area network (WLAN). An example cellular network can operate according to the Long-Term Evolution (LTE) standards as provided by the Third Generation Partnership Project (3GPP). The LTE standards are also referred to as the Evolved Universal Terrestrial Radio Access (E-UTRA) standards. In other examples, other types of cellular networks can be employed, such as second generation (2G) or third generation (3G) cellular networks, e.g., a Global System for Mobile (GSM) cellular network, an Enhanced Data rates for GSM Evolution (EDGE) cellular network, a Universal Terrestrial Radio Access Network (UTRAN), a Code Division Multiple Access (CDMA) 2000 cellular network, and so forth. In further examples, cellular networks can be fifth generation (5G) or beyond cellular networks.

A WLAN can operate according to the Institute of Electrical and Electronic Engineers (IEEE) 802.11 or Wi-Fi Alliance Specifications. In other examples, other types of wireless networks can be employed, such as a Bluetooth link, a ZigBee network, and so forth. Additionally, some wireless networks can enable cellular IoT, such as wireless access networks according to LTE Advanced for Machine-Type Communication (LTE-MTC), narrowband IoT (NB-IoT), and so forth.

Increased usage of the wireless network can lead to increased costs to the manager of the fleet of vehicles, where the cost can be a monetary cost (in examples where the manager is charged for usage of the wireless network) or the cost of reduced capacity of the wireless network for other operations, such as operations involving communications of data between the vehicles and a central entity over the wireless network, where the data can include measurement data from sensors on the vehicles, reports sent by the vehicles, commands sent by the central entity to the vehicles to cause the vehicles to perform respective actions, and so forth.

In accordance with some implementations of the present disclosure, as shown in FIG. 1, a program manager system 100 is able to select program updates 102 to include in a program release package 104 that increases the number of vehicles of a fleet that are able to apply program updates in the program release package 104, and that reduces the cost associated with usage of a wireless network 106 to download program updates to vehicles in the fleet of vehicles. Although examples refer to use of the wireless network 106, it is noted that in other examples, solutions according to some implementations of the present disclosure can be applied to wired networks.

Moreover, solutions according to some implementations of the present disclosure are also applicable to select program updates to include in a program release package for updating programs installed in Internet of Things (IoT) devices. An IoT device can refer generally to an electronic device that is designed or configured to achieve a specific target operation, unlike general-purpose computers (e.g., notebook computers, tablet computers, desktop computers, server computers) or smartphones. Examples of IoT devices include sensors to measure respective parameters (e.g., temperature, pressure, humidity, location, etc.), actuators used to actuate devices between different states (e.g., a thermostat to operate an air conditioning and/or heating system), cameras, household appliances, and so forth. A vehicle is a type of IoT device. Whereas a computer or smartphone (or other similar general-purpose electronic device) can be loaded with different types of applications (at the request of user), an IoT device is configured to execute a specific application to perform the specific target operation of the IoT device; in other words, in some examples, an IoT device is usually pre-loaded with an application (or a set of applications), and a user is unable to download a different application (other than updates to update the pre-loaded application(s)) onto the IoT device.

The program manager system 100 can be implemented as a computer or a collection of computers, which can be part of a cloud system, a server system, and so forth. Although FIG. 1 shows the program updates 102 as being part of the program release package 104, it is noted that in other examples, references to the program updates 102 can be included in the program release package. Thus, as noted above, a program release package including program updates can refer to the program release package actually including the code of the program updates, or including references to the program updates. Similarly, a program update of a program release package can refer to a program update that is included in the program release package, or that is referred to by the program release package.

The program manager system 100 includes a program release package generation engine 108, which is able to generate the program release package 104 according to some examples. The program release package generation engine 108 can include a hardware processing circuit, where a hardware processing circuit can refer to any or some combination of the following: a microprocessor, a core of a multi-core microprocessor, a microcontroller, a programmable integrated circuit device, a programmable gate array, or another type of hardware processing circuit.

Alternatively, the program release package generation engine 108 can include a combination of a hardware processing circuit and machine-readable instructions (software and/or firmware) executable on the hardware processing circuit.

The program manager system 100 further includes a communication transceiver 110 to allow the program manager 100 to communicate wirelessly over the wireless network 106.

In some examples, the program manager system 100 can send the program release package 104, or information identifying the program release package 104, over the wireless network 106 to various vehicles, where FIG. 1 shows vehicles 1, 2, and 3. Although a specific number of vehicles are shown in FIG. 1, it is noted that in other examples, a different number of vehicles can be provided to interact with the program manager system 100.

The program release package 104 can be stored in a storage system of the program manager system 100. Alternatively, the program manager system 100 may store the program release package 104 at a storage system remote from the program manager system 100.

Each vehicle includes a respective collection of programs. For example, vehicle 1 includes program A, version 1 and program B, version 2. Vehicle 2 includes program B, version 1 and program C, version 3. Vehicle 3 includes program A, version 2, program B, version 3, and program C, version 1. The programs in each vehicle are executable on respective ECUs or other electronic components of the vehicle.

Each vehicle also includes a respective program updater 112, which is used to update a program (or multiple programs) in the vehicle, in response to a program update 102 of the program release package 104. Note that the program updater 112 can be associated with a respective program—in other words, the program updater 112 is part of the respective program (or is associated with the respective program). In such examples, there can be multiple program updaters associated with corresponding programs in the vehicle 1. In other examples, the program updater 112 can perform updating of multiple programs in a vehicle.

A program updater 112 includes program code that when executed can perform updating of a respective program using a program update 102 of the program release package 104.

In FIG. 1, a first program update 102 of the program release package 104 for updating program A can include a patch A. In a specific example, patch A can update version 2 of program A to version 3 of program A. As a result, vehicle 3 can apply patch A to update program A, version 2 (which is currently in vehicle 3) to program A, version 3. However, since vehicle 1 includes program A, version 1, vehicle 1 would not be able to apply patch A.

Thus, if the program manager system 100 does not take into account various different versions of programs that are present in the vehicles, then the program manager system 100 may assume that each vehicle with program A would update program A with patch A of the program release package 104, when in fact vehicle 1 would not be able to apply patch A because vehicle 1 does not include version 2 of program A. Therefore, the program manager system 100 may assume that a larger number of vehicles will apply the program updates 102 of the program release package 104 than would occur.

Figure 2:
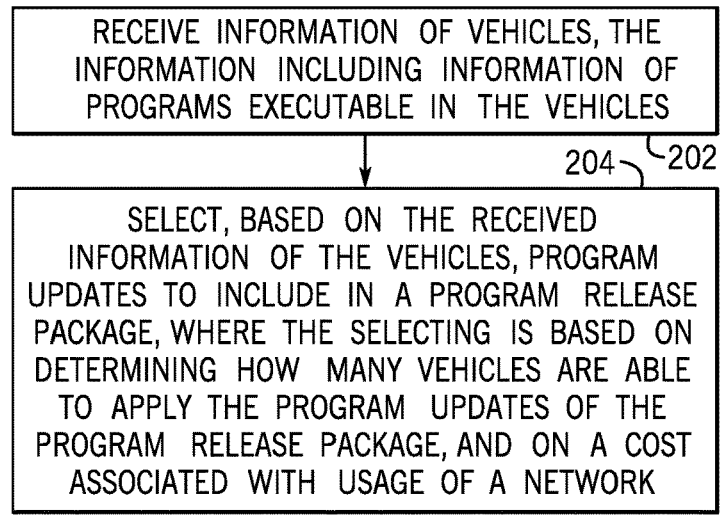
FIG. 2 is a flow diagram of a process of producing a program release package to update programs in vehicles, according to some implementations.

FIG. 2 is a flow diagram of an example process that can be performed by the program release package generation engine 108 according to some implementations. The program release package generation engine 108 receives (at 202) information of vehicles, including vehicles 1, 2, and 3 of FIG. 1. The information received can include information of programs executable in the vehicles.

The program release package generation engine 108 further selects (at 204), based on the received information of the vehicles, program updates to include in a program release package, where the program updates can include a patch to update programs in the vehicles, and where the selecting is based on determining how many vehicles are able to apply the program updates of the program release package, and on a cost associated with usage of a network to download program updates to the vehicles. The selecting attempts to satisfy the goals of increasing the number of vehicles that are able to apply the program updates of the program release package, and reducing the cost associated with usage of the network to download the program updates of the program release package to the vehicles.

In some cases, in addition to the patch, the program updates selected by the program release package generation engine 108 can also include a full updated program to replace a respective program in the vehicles. More generally, the program release package can include one or more patches and/or one or more full updated programs.

The information received by the program release package generation engine 108 can include information identifying what programs (or identifying electronic components running programs) are in the vehicles, and versions of various programs that are installed in the vehicles. The information can be received from the vehicles, such as over the wireless network 106. For example, a vehicle can register with the program manager system 100 to provide information regarding program versions installed on the vehicle. Alternatively, the information can be received from other data sources that have maintained information about programs (and/or electronic components) and program versions in the vehicles. In the latter examples, the information about programs (and/or electronic components) and program versions in the vehicles can be maintained in a central repository, such as that maintained by the program manager system 100, or by another system.

Using the information about program versions installed in the vehicles, the program release package generation engine 108 can more intelligently select program updates to include in the program release package 104 that increases the number of vehicles that can apply program updates in the program release package 104, and reduces the costs associated with usage of a network to download program updates to the vehicles.

For example, the program release package generation engine 108 can determine, based on the information indicating that vehicle 1 includes version 1 of program A, and vehicle 3 includes version 2 of program A, that two different patches for program A should be included as program updates in the program release package 104. The two different patches for program A can include a first program A patch that updates version 1 of program A to version 3 of program A, and a second program A patch that updates version 2 of program A to version 3 of program A.

In other cases, the program release package generation engine 108 may determine that instead of including different patches of program A, a full updated program A should be included in the program release package 104 instead. For example, if there are thousands of vehicles in a fleet where there can be hundreds of different versions of program A, then including hundreds of patches for these different versions of program A may be unwieldy and can in fact consume more bandwidth of the wireless network 106 when downloading the different patches to the vehicles. The hundreds of patches can have an aggregate size that is larger than the size of the full updated program. Moreover, having to select a large number of patches to include in the program release package 104 increases processing overhead at the program manager system 100, which makes operations of the program manager system 100 more inefficient. In such a scenario, it may be more efficient to include a full updated program in the program release package 104 to use for updating the program A in the vehicles of the fleet.

In further examples, some of the vehicles may not include the program to be updated at all, in which case the full updated program would have to be included in the program release program 104 to provide the program to the vehicle. For example, an electronic component may have been newly installed in the vehicle, and the program of the newly installed electronic component may not yet have been downloaded to the vehicle.

Thus, generally, selecting program updates to include in the program release package can be based on how many vehicles can use patches included in the program release package 104, and how many vehicles are expected to download a full updated program that is part of the program release package 104. For example, if a relatively large number of vehicles would download the full update program and would not be able to use patches, then the program manager system 100 can decide to include the full updated program instead of patches in the program release package 104.

In some implementations, a graphical user interface (GUI) can be presented by the program manager system 100, where the GUI can be displayed on a display device associated with an administrator. The display device can be part of a client computer of the administrator, which can be in communication with the program manager system 100. In other examples, the display device can be part of the program manager system 100.

Figure 3:
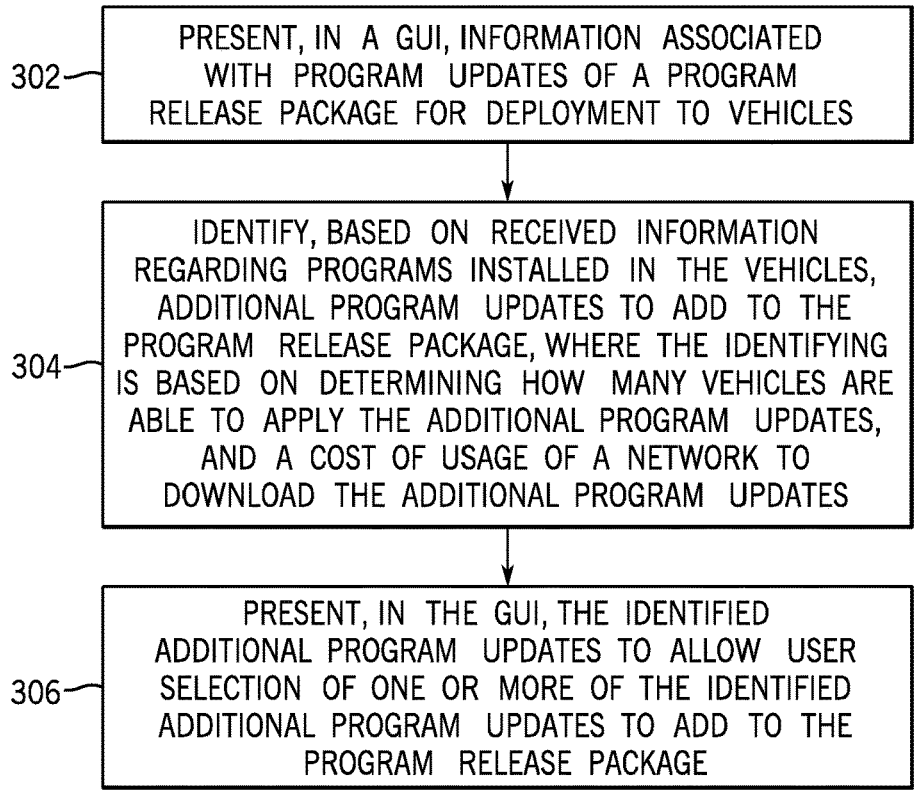
FIG. 3 is a flow diagram of a process for producing a program release package according to further examples.

FIG. 3 is a flow diagram of a process according to further examples, which can be performed by the program manager system 100. The program manager system 100 presents (at 302), in a GUI, information associated with program updates of a program release package for deployment to vehicles. Using the GUI, the administrator can select (from the program updates in the GUI) patches and/or full updated programs to include in the program release package.

The GUI can be presented in examples where a human administrator is involved in defining the initial content of the program release package. In other examples where a human administrator is not involved in defining the content of the program release package, the GUI would not have to be presented.

The program manager system 100 further identifies (at 304), based on received information regarding programs installed in the vehicles, additional program updates to add to the program release package, where the identifying is based on determining how many vehicles are able to apply the additional program updates, and a cost of usage of a network to download the additional program updates. The identified additional program updates are in addition to those that been selected by the administrator using the GUI. The notion here is that the program manager system 100 is able to suggest additional program updates (patches and/or full updated programs), in addition to those initially selected by the administrator, to add to the program release package to satisfy the goals of increasing coverage of program updates to the vehicles and reducing network usage cost.

The suggested additional program updates can be considered to be feedback provided to the administrator (or other entity) that is responsible for updating programs in a fleet of vehicles. Given an initial set of program updates that may have been selected by the administrator (or other entity) for inclusion in the program release package, the program manager system 100 can use information about programs in vehicles to suggest additional program updates as feedback to the entity. As part of the selecting program updates to include in a program release package, feedback can be provided to the entity defining the program release package on how many vehicles will not be able to apply the program updates of the program release package, and how many vehicles are expected to download the full updated program rather than a patch.

The program manager system 100 presents (at 306), in the GUI, the identified additional program updates to allow user selection (such as by the administrator) of one or more of the identified additional program updates to add to the program release package. This allows the administrator to have control over which of the identified additional program updates to include in the program release package.

FIGS. 4 and 5 are examples of GUI screens that can be presented by the program manager system 100. FIG. 4 shows an example of a patch package GUI screen 400, which lists suggested patches that can be selected for inclusion in a program release package. FIG. 5 shows a full package GUI screen 500, which shows full updated programs that can be selected for inclusion in a program release package.

Although specific example GUI screens are shown in FIGS. 4 and 5, it is noted that in other examples, GUI screens containing other information with other arrangements can be presented. Also, in alternative examples, one GUI screen can show both patches and full updated programs that can be selected for inclusion in a program release package.

The information included in each of the patch package GUI screen 400 and the full package GUI screen 500 may have be provided by the program manager system 100 (including the program release package generation engine 108) in response to information of programs (including program versions) executable in vehicles of a fleet of vehicles.

The patch package GUI screen 400 can be arranged generally in tabular form, with rows corresponding to different programs, and columns indicating different information associated with the programs. For example, a first row 402 of the patch package GUI screen 400 includes information pertaining to program A, a second row 404 includes information pertaining to program B, and a third row 406 includes information pertaining to program C.

A column 408 of the patch package GUI screen 400 lists the program names (of programs A, B, and C), a column 410 lists the sizes (where applicable) of the respective full updated programs (for replacing programs A, B, and C) or can include an indicator that a full updated program does not exist for a program, a column 412 lists a missing source version associated with each program (for indicating which specific patch is missing), a column 414 was an estimated number of vehicles that may be affected by the respective patch, and a column 416 includes a selectable link (or other control element that is user selectable) that can be selected by a user to upload the respective program patch to the program release package.

The column 408 can identify names of programs in the vehicles, or alternatively, can identify names or identifiers of electronic components (e.g., ECUs) in which programs are executable.

The missing source version included for each program in column 412 identifies a patch from the missing source version to a current version of the program that is to be updated in the respective vehicles. For example, for program A, the missing source version is 12.0.5, which means that there is no patch from version 12.0.5 of program A to the current version of program A. User selection of the upload patch link "Link A" (column 416) in row 402 would cause the patch for upgrading from version 12.0.5 to the current version of program A to be included in the program release package.

Column 414 includes an estimated number of affected vehicles to give the administrator an idea of how many vehicles are affected by the patch corresponding to the missing patch version. If the estimated number of affected vehicles is large, then that is an indication to the administrator that the respective patch should be added to the program release package, since that would increase the number of vehicles that are covered by the program release package. However, if the estimated number of affected vehicles is small (such as for program B, where the estimated number of affected vehicles listed in column 414 and row 404 is one), then the administrator may decide not to add the respective program patch into the program release package.

In column 410, an indication is provided for program C (row 406), that no full version of program C is available. This is an indication to the administrator that only program patches for program C can be included in the program release package to update program C at the vehicles, since no full updated program is available.

In other examples, the patch package GUI screen 400 can include other or alternative information. For example, the patch package GUI screen 400 can include an estimated number of vehicles that would not be able to apply patch(es) for a particular program (e.g., program A) that is (are) currently included in the program release package.

The full package GUI screen 500 of FIG. 5 can also be similarly arranged in tabular format, with respective rows corresponding to respective different programs, and columns including various different information for the respective programs. In FIG. 5, a first row includes information for program A, and a second row 504 includes information for program B.

A column 506 lists the names of the programs (or names or identifiers of electronic components in which programs are executable), a column 508 identifies a version in release, i.e., the most current version of the full updated program. A column 510 indicates the estimated number of affected vehicles, which indicates how many vehicles would download the full updated program if the full updated program is included in the program release package. For example, the estimated number of affected vehicles in column 510 represents the number of vehicles that would not be successfully updated if the full updated program were not included in the program release package, given the program patches that are currently in the program release package.

A column 512 includes a user-selectable link or other control element that when selected causes the respective full updated program to be included in the program release package.

In some cases, information regarding programs installed on vehicles may not be reliable. For example, it may have been awhile since the program manager system 100 has communicated with a given vehicle. In the interim, a manual update of a particular program may have been installed on the particular vehicle, such as when the particular vehicle was taken to a repair facility to perform a repair. The program manager system 100 may not have been informed of this manual program update of the particular vehicle, so that the information that was previously received from the particular vehicle regarding the programs installed on the particular vehicle may no longer be accurate.

In accordance with some implementations of the present disclosure, when selecting program updates to include in a program release package, or when providing feedback, such as to a GUI as shown in FIGS. 4 and 5, of program updates to include in a program release package, the program manager system 100 can also provide information of a last communication with a given vehicle, where this information of the last communication with the given vehicle provides an indication of a reliability of the information of program versions that are currently installed in the given vehicle. The administrator (or other entity) can use the reliability indication to decide whether or not to add a specific program update to the program release package. Alternatively, the administrator can respond to a reliability indication (indicating that the information from the given vehicle is not reliable due to the passage of time) by initiating a communication with the given vehicle to obtain more current information of program versions in the given vehicle.

Figure 6:
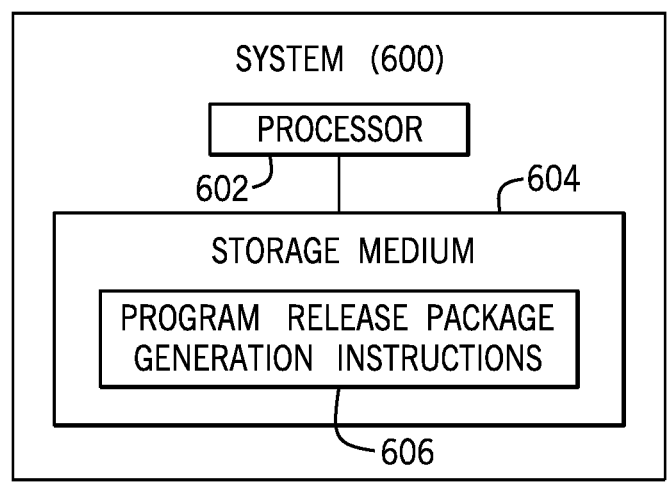
FIG. 6 is a block diagram of a system according to some examples.

FIG. 6 is a block diagram of a system 600 (which can be an example of the program manager system 100 of FIG. 1). The system 600 includes a processor (or multiple processors) 602. A processor can include a microprocessor, a core of a multi-core microprocessor, a microcontroller, a programmable integrated circuit, a programmable gate array, or another hardware processing circuit.

The system 600 includes a non-transitory machine-readable or computer-readable storage medium 604, which stores machine-readable instructions, such as program release generation instructions 606 that are executable on the processor 602 to perform respective tasks, such as those of the program release package generation engine 108 of FIG. 1. Instructions executable on a processor can refer to instructions executable on a single processor, or on multiple processors.

The storage medium 604 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
   receiving, by a system comprising a processor, information of vehicles, the information comprising information of programs executable in the vehicles;
   selecting, by the system based on the received information of the vehicles, program updates to include in a program release package, the program updates comprising a patch to update a program in the vehicles, the selecting based on satisfying a goal of increasing a number of the vehicles that are able to apply the program release package, and a goal of reducing usage of network bandwidth when the vehicles download the program release package;
   as part of the selecting, providing feedback to an entity defining the program release package on how many vehicles will not be able to apply the program updates of the program release package, and how many vehicles are expected to download a full updated program rather than the patch; and
   downloading, by the system, the program release package over a network to the vehicles to cause the vehicles to update the programs in the vehicles using the program release package.

2. The method of claim 1, wherein providing the feedback further comprises providing an indication of a size of the full updated program.

3. The method of claim 1, wherein providing the feedback comprises providing suggested program updates to include in the program release package.

4. The method of claim 3, wherein providing the suggested program updates to include in the program release package comprises identifying specific patches to include.

5. The method of claim 3, wherein providing the suggested program updates to include in the program release package comprises identifying specific full updated programs to include.

6. The method of claim 3, wherein providing the feedback further comprises providing information of a last communication with a given vehicle to provide an indication of a reliability of information relating to program versions currently installed in the given vehicle.

7. The method of claim 1, wherein the received information of the vehicles comprises information of versions of the programs in the vehicles, and wherein the selecting of the program updates to include in the program release package is based on using the information of the versions of the programs in the vehicles to satisfy the goal of increasing the number of the vehicles that are able to apply the program release package, and the goal of reducing the usage of the network bandwidth when the vehicles download the program release package.

8. The method of claim 7, wherein the selecting of the program updates to include in the program release package uses, by the system, the information of the versions of programs in the vehicles to decide between including, in the program release package, a full updated program for a given program or a patch for the given program.

9. The method of claim 7, further comprising:
   identifying, by the system based on information of versions of a given program in the vehicles, patches useable to update to a new version of the given program from the versions of the given program in the vehicles;
   determining, by the system, an aggregate size of the patches useable to update the versions of the given program in the vehicles to the new version of the given program;
   determining, by the system, a size of a full updated program for the given program,
   wherein the selecting of the program updates to include in the program release package uses the aggregate size of the patches and the size of the full updated program.

10. A system comprising:
    a processor; and
    a non-transitory storage medium storing instructions executable on the processor to:
      present, in a graphical user interface (GUI), information associated with program updates of a program release package for deployment to vehicles, the program updates comprising a patch to update a program in the vehicles from a first version to a second version of the program;
      identify, based on received information regarding programs installed in the vehicles, additional program updates to add to the program release package, the identifying based on satisfying a goal of increasing a number of the vehicles that are able to apply the program release package, and a goal of reducing usage of network bandwidth when the vehicles download the program release package;
      as part of the identifying, provide feedback to an entity defining the program release package on how many vehicles will not be able to apply the program updates of the program release package, and how many vehicles are expected to download a full updated program rather than the patch;
      present, in the GUI, the identified additional program updates; and
      download, over a wireless network, the program release package to the vehicles to cause the vehicles to update the programs in the vehicles using the program release package.

11. The system of claim 10, wherein the identified additional program updates comprise additional patches to add to the program release package to increase the number of the vehicles that are able to apply the program release package and to reduce a cost of usage of the network bandwidth of the wireless network.

12. The system of claim 10, wherein the identified additional program updates comprise a full updated program to add to the program release package to increase the number of the vehicles that are able to apply the program release package.

13. The system of claim 12, wherein the GUI includes an indication that a full updated program is not included for a particular electronic component of at least some of the vehicles.

14. The system of claim 10, wherein the vehicles are part of a target group of vehicles, and the instructions are executable on the processor to present, in the GUI, information regarding a time of last communication with a vehicle in the target group.

15. The system of claim 10, wherein the received information comprises information of versions of the programs in the vehicles, and wherein the identifying of the additional program updates to add to the program release package is based on using the information of the versions of the programs in the vehicles to satisfy the goal of increasing the number of the vehicles that are able to apply the program release package, and the goal of reducing the usage of the network bandwidth when the vehicles download the program release package.

16. The system of claim 15, wherein the identifying of the additional program updates to add to the program release package uses the information of the versions of the programs in the vehicles to decide between including, in the program release package, a full updated program for a given program or a patch for the given program.

17. A non-transitory machine-readable storage medium storing instructions that upon execution cause a system to:

receive information of vehicles, the information comprising information of programs executable in the vehicles;

select, based on the received information of the vehicles, program updates to include in a program release package, the program updates comprising a patch to update a program in the vehicles, the selecting based on satisfying a goal of increasing a number of the vehicles that are able to apply the program release package, and a goal of reducing usage of network bandwidth when the vehicles download the program release package;

as part of the selecting, provide feedback to an entity defining the program release package on how many vehicles will not be able to apply the program updates of the program release package, and how many vehicles are expected to download a full updated program rather than the patch; and download, over a wireless network, the program release package to the vehicles to cause the vehicles to update the programs in the vehicles using the program release package.

18. The non-transitory machine-readable storage medium of claim 17, wherein the selecting comprises selecting a full updated program to include in the program release package to increase the number of the vehicles that are able to apply the program release package.

19. The non-transitory machine-readable storage medium of claim 17, wherein the program updates are to update programs of electronic components in the vehicles.

\* \* \* \* \*